(12) United States Patent
Sawai

(10) Patent No.: US 7,950,610 B2
(45) Date of Patent: May 31, 2011

(54) DISPLAY BASE INCLUDING TORQUE LIMITER AND TORQUE LIMITER

(75) Inventor: Kunio Sawai, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 704 days.

(21) Appl. No.: 11/869,188

(22) Filed: Oct. 9, 2007

(65) Prior Publication Data
US 2008/0083293 A1    Apr. 10, 2008

(30) Foreign Application Priority Data

Oct. 10, 2006  (JP) ................................. 2006-276028

(51) Int. Cl.
*A47F 5/02*  (2006.01)

(52) U.S. Cl. ...................... 248/131; 248/415; 248/349.1; 361/679.06

(58) Field of Classification Search .................. 248/131, 248/415, 418, 349.1, 919; 108/103; 361/679.06, 361/679.07, 679.21; 74/422, 412 R
See application file for complete search history.

(56) References Cited

U.S. PATENT DOCUMENTS

| | | | | |
|---|---|---|---|---|
| 4,905,543 | A * | 3/1990 | Choi | 74/827 |
| 5,749,556 | A * | 5/1998 | Matsuoka et al. | 248/349.1 |
| 6,647,819 | B1 * | 11/2003 | Chang | 74/421 A |
| 7,184,266 | B1 * | 2/2007 | Chen et al. | 361/679.21 |
| 7,384,021 | B2 * | 6/2008 | Liao | 248/415 |
| 7,677,517 | B2 * | 3/2010 | Suzuki | 248/349.1 |
| 2003/0050121 | A1 | 3/2003 | Takada et al. | |
| 2008/0099652 | A1 * | 5/2008 | Sawai et al. | 248/419 |
| 2008/0105070 | A1 * | 5/2008 | Sawai et al. | 74/412 R |
| 2008/0105073 | A1 * | 5/2008 | Sawai et al. | 74/425 |
| 2008/0111929 | A1 * | 5/2008 | Yokota et al. | 348/836 |
| 2008/0149800 | A1 * | 6/2008 | Katsumata et al. | 248/349.1 |
| 2008/0192419 | A1 * | 8/2008 | Sawai | 361/681 |
| 2008/0272262 | A1 * | 11/2008 | Katsumata et al. | 248/349.1 |
| 2009/0268107 | A1 * | 10/2009 | Shimizu | 348/836 |
| 2009/0284668 | A1 * | 11/2009 | Sawai et al. | 348/836 |

FOREIGN PATENT DOCUMENTS

| | | |
|---|---|---|
| EP | 1 542 458 A1 | 6/2005 |
| JP | 6-11016 A | 1/1994 |
| JP | 7-190083 A | 7/1995 |
| JP | 10-14170 A | 1/1998 |
| JP | 2004-316794 | 11/2004 |
| JP | 2004-360809 A | 12/2004 |

OTHER PUBLICATIONS

The Extended European Search Report dated May 20, 2010 (Seven (7) pages).
Office Action in Japanese Patent Application No. 2006-276028 dated Mar. 3, 2011.

* cited by examiner

*Primary Examiner* — A. Joseph Wujciak, III
(74) *Attorney, Agent, or Firm* — Crowell & Moring LLP

(57) ABSTRACT

A display base including a torque limiter capable of inhibiting the number of components from increase and the torque limiter are obtained. This display base includes a driving source turning a display screen portion and a transmission gear portion for transmitting driving force of the driving source to a turning portion. The transmission gear portion includes a torque limiter having a driven gear member integrally provided with a plurality of support sections formed concentrically with rotational axis, a drive gear member fitted onto an outer peripheral surface of each of the support sections of the driven gear member, and a spring member pressing the support sections against the drive gear member by being press-fitted into an inner peripheral surface of each of the support sections of the driven gear member.

10 Claims, 10 Drawing Sheets

DISPLAY BASE INCLUDING TORQUE LIMITER AND TORQUE LIMITER

BACKGROUND OF THE INVENTION

1. Field of the Invention

The present invention relates to a display base including a torque limiter and the torque limiter.

2. Description of the Background Art

A torque limiter applied to a display base comprising a driving source turning a display screen portion and a transmission gear portion for transmitting the driving force of the driving source to a turning portion is know in general, as disclosed in Japanese Patent Laying-Open Nos. 7-190083 (1995), 2004-360809, and 6-11016 (1994), for example.

The aforementioned Japanese Patent Laying-Open No. 7-190083 discloses a torque limiter comprising a rotating member (second member) having a contact surface in a rotational direction and rotating integrally with a shaft, a driving gear plate having a contact surface at a position to be opposed to the contact surface of the rotating member and provided coaxially rotatably with the rotating member, a pressure spring (helical compression spring), a press plate urged by the pressure spring, an adjusting ring for adjusting the pressing force of the pressure spring and two slide plates held between the rotating member, the driving gear plate and the press plate respectively. In this torque limiter, a driving torque of the driving gear plate adjusted to a prescribed value is transmitted to the rotating member through the slide plate held between the driving gear plate and the rotating member with the pressing force of the pressure spring (helical compression spring) and rotation of the driving gear plate is not transmitted to the rotating member by slip of the slide plates at a constant driving torque or more.

The aforementioned Japanese Patent Laying-Open No. 2004-360809 discloses a gear with a torque limiter comprising two major-diametral gear and minor-diametral gear receiving a rotating shaft and so provided as to be opposed to each other, four steel balls rotatably arranged in the major-diametral gear, two friction discs holding the four steel balls therebetween from both sides of the major-diametral gear, and a spring engaging the minor-diametral gear with one of the friction discs of the major-diametral gear to allow transmission of the driving torque and elastically urging the minor-diametral gear to the major-diametral gear. In this gear with a torque limiter, the driving torque of the minor-diametral gear adjusted to a prescribed value is transmitted to the major-diametral gear through the two friction disc with the pressing force of the spring, while, when at a constant driving torque or more, rotation (driving torque) of the minor-diametral gear is not transmitted to the major-diametral gear by slip of the friction disc closer to the minor-diametral gear due to rotation of the four steel balls.

The aforementioned Japanese Patent Laying-Open No. 6-11016 discloses a torque limiter (viscous joint) comprising a minor-diametral gear (driving gear) directly connected with an impeller, a major-diametral gear (driven gear) having a storage portion (viscous fluid chamber) rotatably storing the impeller of the minor-diametral gear therein, viscous fluid sealed in the storage portion of the major-diametral gear with a mounting side plate fitted with an O-ring. In the viscous joint described in this Japanese Patent Laying-Open No. 6-11016, the impeller rotated with rotation of the minor-diametral gear (driving gear) causes swirling current in the viscous fluid of the major-diametral gear (driven gear), whereby the major-diametral gear is driven following rotation of the impeller through prescribed driving torque.

However, the conventional torque limiter proposed in the aforementioned Japanese Patent Laying-Open No. 7-190083 must be provided with a large number of members such as the adjusting ring for providing constant urging force to the pressure spring or the press plate urging the pressing force of the pressure spring. Therefore, in a case where the torque limiter described in Japanese Patent Laying-Open No. 7-190083 is applied to a base of display (liquid crystal display, for example) comprising a driving source turning a display screen portion and a transmission gear portion for transmitting the driving force of the driving source to a turning portion, the number of components of the transmission gear portion is disadvantageously increased.

The conventional torque limiter (gear with a torque limiter) proposed in the aforementioned Japanese Patent Laying-Open No. 2004-360809 must be provided with a large number of members such as the four steel balls rotatably arranged inside the major-diametral gear and the two friction disc holding the four steel balls from the both side of the major-diametral gear. Therefore, in a case where the gear with a torque limiter described in Japanese Patent Laying-Open No. 2004-360809 is applied to a base of display (liquid crystal display, for example) comprising a driving source turning a display screen portion and a transmission gear portion for transmitting the driving force of the driving source to a turning portion, the number of components of the transmission gear portion is disadvantageously increased.

The conventional torque limiter (viscous joint) proposed in the aforementioned Japanese Patent Laying-Open No. 6-11016 must be provided with a large number of members such as the viscous fluid, the O-ring for sealing the viscous fluid in the storage portion and the mounting side plate fitted with the O-ring. Therefore, in a case where the viscous joint described in Japanese Patent Laying-Open No. 6-11016 is applied to a base of display (liquid crystal display, for example) comprising a driving source turning a display screen portion and a transmission gear portion for transmitting the driving force of the driving source to a turning portion, the number of components of the transmission gear portion is disadvantageously increased.

SUMMARY OF THE INVENTION

The present invention has been proposed in order to solve the aforementioned problem, and an object of the present invention is to provide a display base including a torque limiter capable of inhibiting the number of components from increase and the torque limiter.

A display base according to a first aspect of the present invention comprises a driving source turning a display screen portion, and a transmission gear portion for transmitting driving force of the driving source to a turning portion, wherein the transmission gear portion includes a torque limiter having a driven gear member integrally provided with a plurality of support sections formed concentrically with rotational axis, a drive gear member fitted onto outer peripheral surfaces of the support sections of the driven gear member, and a spring member pressing the support sections against the drive gear member by being press-fitted into inner peripheral surfaces of the support sections of the driven gear member.

In the display base according to the first aspect of the present invention, as hereinabove described, the transmission gear portion includes the torque limiter constituted by three members of the driven gear member integrally provided with the plurality of support sections formed concentrically with the rotational axis, the drive gear member fitted onto the outer peripheral surfaces of the support sections of the driven gear member, and the spring member press-fitted into the inner peripheral surfaces of the support sections of the driven gear and pressing the support sections against the drive gear member, whereby the driving torque responsive to the pressure contact force by the spring member can be transmitted from the drive gear member to the driven gear member while bringing the outer peripheral surfaces of the support sections of the driven gear member and the inner peripheral surface of the drive gear member into direct surface contact with each other. Thus, the number of components can be inhibited from increase dissimilarly to a structure including a transmission gear portion having a torque limiter interposing a plurality of friction discs or a plurality of steel balls in addition to gear members such as a drive gear and a driven gear.

In the aforementioned display base according to the first aspect, the spring member constituting the torque limiter is preferably an annular coil spring, and the spring member is preferably press-fitted into the inner peripheral surfaces of the support sections of the driven gear member in a state where the diameter of a coil is contracted from an unloaded state. According to this structure, pressing force for expanding the support sections of the driven gear member outward can be easily obtained through restoring force (elastic energy) restoring the shape of the spring from a state where the coil spring is press-fitted into the inner peripheral surfaces of the support sections of the driven gear member into the unloaded state.

In the aforementioned display base according to the first aspect, forward ends of the support sections of the driven gear member constituting the torque limiter preferably integrally include stop portions for inhibiting the drive gear member from slipping off to a first side. According to this structure, the stop portions of the driven gear member come into contact with the drive gear member and hence the drive gear member can be easily inhibited from slipping off from the driven gear member to the first side of the drive gear member also when the drive gear member rotates at prescribed driving torque or more and slips on the outer peripheral surfaces of the support sections of the driven gear member.

In the aforementioned display base according to the first aspect, the driven gear member constituting the torque limiter preferably integrally includes stop sections for inhibiting the drive gear member from slipping off to a second side, provided between the plurality of support sections of the driven gear member. According to this structure, the driven gear member integrally includes stop sections for inhibiting the drive gear member from slipping off to a second side, provided between the plurality of support sections of the driven gear member. According to this structure, the stop sections of the driven gear member come into contact with the drive gear member and hence the drive gear member can be easily inhibited from slipping off from the driven gear member to the second side of the drive gear member also when the drive gear member rotates at prescribed driving torque or more and slips on the outer peripheral surfaces of the support sections of the driven gear member.

In the aforementioned display base according to the first aspect, the driven gear member constituting the torque limiter preferably integrally includes stop portions for inhibiting the drive gear member from slipping off to a first side, provided on forward ends of the support sections of the driven gear member, and stop sections for inhibiting the drive gear member from slipping off to a second side, provided between the plurality of support sections of the driven gear member, and the stop portions and the stop sections are preferably so arranged as to hold the drive gear member therebetween from above and below along a rotational axis direction of the drive gear member. According to this structure, the drive gear member can be reliably rotatably held on the outer peripheral surfaces of the support sections of the driven gear member with the plurality of stop portions and stop sections.

In the aforementioned display base according to the first aspect, the driven gear member constituting the torque limiter preferably integrally includes seat portions for holding the spring member, provided between the plurality of support sections of the driven gear member. According to this structure, the seat portions inhibit the spring member from moving to the second side and hence the spring member can be reliably arranged on the inner peripheral surfaces of the support sections of the driven gear member.

In the aforementioned display base according to the first aspect, the driven gear member constituting the torque limiter preferably integrally includes projecting portions for inhibiting the spring member from slipping off to a first side, provided on forward ends of the inner peripheral surfaces of the support sections of the driven gear member. According to this structure, the projecting portions of the driven gear member inhibit the spring member from moving to the first side of the spring member and hence the spring member can be easily inhibited from slipping off from the inner peripheral surfaces of the support sections of the driven gear member to the first side.

In the aforementioned display base according to the first aspect, the driven gear member constituting the torque limiter preferably integrally includes projecting portions for inhibiting the spring member from slipping off to a first side, provided on forward ends of the inner peripheral surfaces of the support sections of the driven gear member, and seat portions for holding the spring member, and the projecting portions and the seat portions are preferably so arranged as to hold the spring member therebetween from above and below. According to this structure, the spring member can be reliably held on the inner peripheral surfaces of the support sections of the driven gear member with the plurality of projecting portions and seat portions.

In the aforementioned display base according to the first aspect, the driven gear member constituting the torque limiter preferably integrally includes stop sections for inhibiting the drive gear member from slipping off to a second side and seat portions for holding the spring member, and a plurality of the support sections of the driven gear member are preferably concentrically arranged at prescribed angle intervals, and the stop sections and the seat portions are preferably alternately provided between the support sections. According to this structure, the driven gear member can be integrally provided with the support sections, the stop sections and the seat portions concentrically having different functions respectively and hence the driven gear member can stably arrange the drive gear member and the spring member.

In the aforementioned display base according to the first aspect, the driven gear member constituting the torque limiter preferably integrally includes a driven gear portion, and the drive gear member integrally includes a drive gear portion. According to this structure, driving torque transmitted to the drive gear member can be easily transmitted from the driven gear member to other rotating member with the gear portion.

A torque limiter according to a second aspect of the present invention comprises a first rotating member integrally provided with a plurality of support sections formed concentrically with a rotational axis, a second rotating member fitted onto outer peripheral surfaces of the support sections of the first rotating member, and a spring member pressing the support sections against the second rotating member by being press-fitted into inner peripheral surfaces of the support sections of the first rotating member.

As hereinabove described, the torque limiter according to the second aspect of the present invention comprises the first rotating member integrally provided with the plurality of support sections formed concentrically with the rotational axis, the second rotating member fitted onto the outer peripheral surfaces of the support sections of the first rotating member, and the spring member pressing the support sections against the second rotating member by being press-fitted into the inner peripheral surfaces of the support sections of the first rotating member, whereby the driving torque responsive to the pressure contact force by the spring member can be transmitted from the second rotating member to the first rotating member while bringing the outer peripheral surfaces of the support sections of the first rotating member and the inner peripheral surfaces of the second rotating member into direct surface contact with each other. Thus, the number of components can be inhibited from increase dissimilarly to a structure of a torque limiter interposing a plurality of friction discs or a plurality of steel balls in addition to rotating members such as a first rotating member and a second rotating member.

In the aforementioned torque limiter according to the second aspect, the spring member is preferably an annular coil spring, and the spring member is preferably press-fitted into the inner peripheral surfaces of the support sections of the first rotating member in a state where the diameter of a coil is contracted from an unloaded state. According to this structure, pressing force for expanding the support sections of the first rotating member outward can be easily obtained through restoring force (elastic energy) restoring the shape of the spring from a state where the coil spring is press-fitted into the inner peripheral surfaces of the support sections of the first rotating member into the unloaded state.

In the aforementioned torque limiter according to the second aspect, forward ends of the support sections of the first rotating member preferably integrally include stop portions for inhibiting the second rotating member from slipping off to a first side. According to this structure, the stop portions of the first rotating member come into contact with the second rotating member and hence the second rotating member can be easily inhibited from slipping off from the first rotating member to the first side of the second rotating member also when the second rotating member rotates at prescribed driving torque or more and slips on the outer peripheral surfaces of the support sections of the first rotating member.

In the aforementioned torque limiter according to the second aspect, the first rotating member preferably integrally includes stop sections for inhibiting the second rotating member from slipping off to a second side, provided between the plurality of support sections of the first rotating member. According to this structure, the stop sections of the first rotating member come into contact with the second rotating member and hence the second rotating member can be easily inhibited from slipping off from the first rotating member to the second side of the second rotating member also when the second rotating member rotates at prescribed driving torque or more and slips on the outer peripheral surfaces of the support sections of the first rotating member.

In the aforementioned torque limiter according to the second aspect, the first rotating member preferably integrally includes stop portions for inhibiting the second rotating member from slipping off to a first side, provided on forward ends of the support sections of the first rotating member, and stop sections for inhibiting the second rotating member from slipping off to a second side, provided between the plurality of support sections of the first rotating member, and the stop portions and the stop sections are preferably so arranged as to hold the second rotating member therebetween from above and below along a rotational axis direction of the second rotating member. According to this structure, the second rotating member can be reliably rotatably held on the outer peripheral surfaces of the support sections of the first rotating member with the plurality of stop portions and stop sections.

In the aforementioned torque limiter according to the second aspect, the first rotating member preferably integrally includes seat portions for holding the spring member, provided between the plurality of support sections of the first rotating member. According to this structure, the seat portions inhibit the spring member from moving to the second side and hence the spring member can be reliably arranged on the inner peripheral surfaces of the support sections of the first rotating member.

In the aforementioned torque limiter according to the second aspect, the first rotating member preferably integrally includes projecting portions for inhibiting the spring member from slipping off to a first side, provided on forward ends of the inner peripheral surface of the support sections of the first rotating member. According to this structure, the projecting portions of the first rotating member inhibit the spring member from moving to the first side and hence the spring member can be easily inhibited from slipping off from the inner peripheral surfaces of the support sections of the first rotating member to the first side.

In the aforementioned torque limiter according to the second aspect, the first rotating member preferably integrally includes projecting portions for inhibiting the spring member from slipping off to a first side, provided on forward ends of the inner peripheral surfaces of the support sections of the first rotating member, and seat portions for holding the spring member, and the projecting portions and the seat portions are preferably so arranged as to hold the spring member therebetween from above and below. According to this structure, the spring member can be reliably held on the inner peripheral surfaces of the support sections of the first rotating member with the plurality of projecting portions and seat portions.

In the aforementioned torque limiter according to the second aspect, the first rotating member preferably integrally includes stop sections for inhibiting the second rotating member from slipping off to a second side and seat portions for holding the spring member, and a plurality of the support sections of the first rotating member are preferably concentrically arranged at prescribed angle intervals, and the stop sections and the seat portions are preferably alternately provided between the support sections. According to this structure, the first rotating member is integrally provided with the support sections, the stop sections and the seat portions concentrically having different functions respectively and hence the first rotating member can stably arrange the second rotating member and the spring member.

In the aforementioned torque limiter according to the second aspect, the first rotating member preferably integrally includes a driven gear portion, and the second rotating member preferably integrally includes a drive gear portion. According to this structure, driving torque transmitted to the second rotating member can be easily transmitted from the first rotating member to other rotating member with the gear portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be hereinafter described with reference to the drawings.

A structure of a torque limiter and a base provided with the torque limiter according to the embodiment of the present invention will be now described with reference to FIGS. 1 to 13. This embodiment of the present invention is applied to a base of a liquid crystal display, which is an exemplary of a display.

Figure 1:
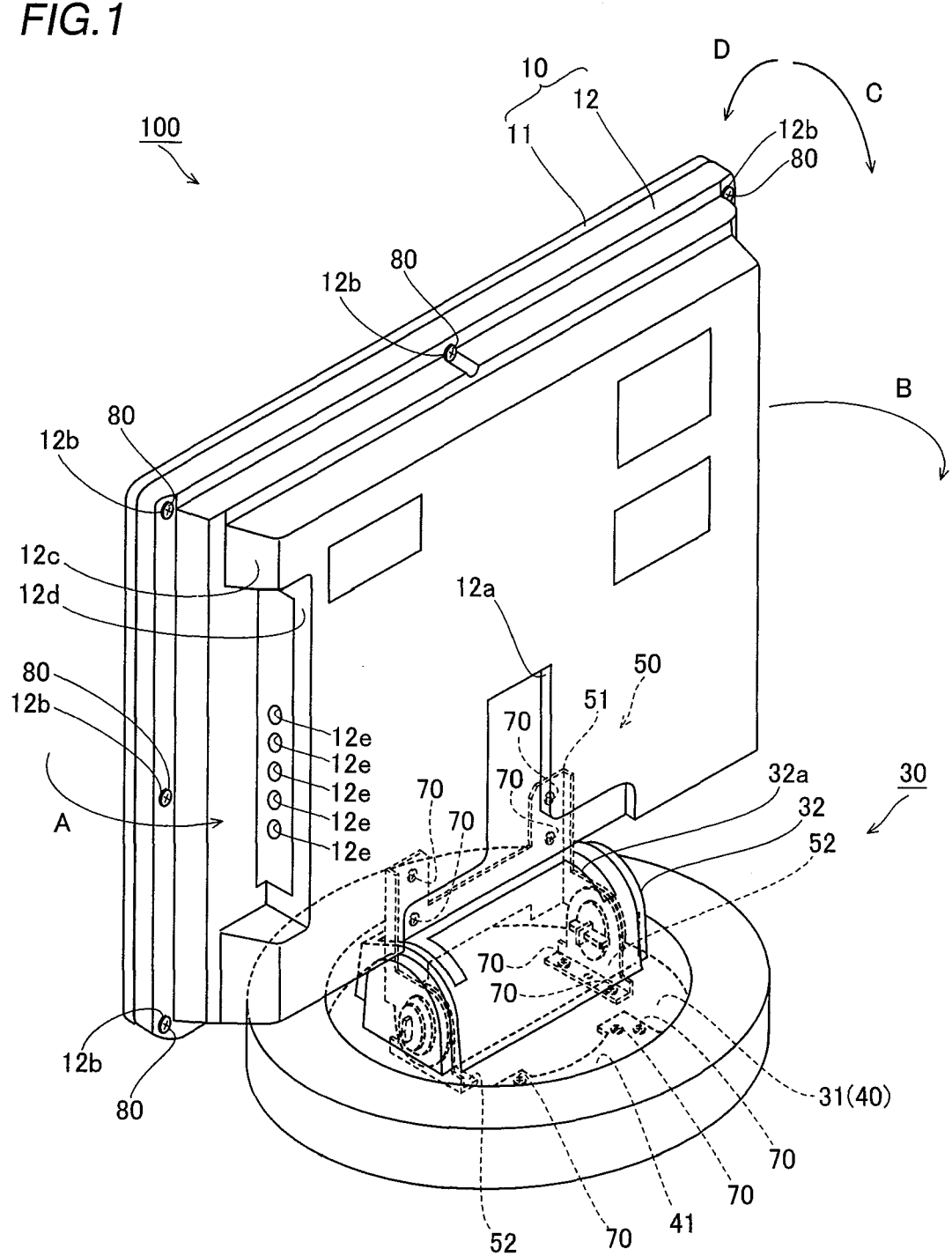
FIG. 1 is a perspective view showing an overall structure of a liquid crystal display provided with a base including a torque limiter according to an embodiment of the present invention.

A liquid crystal display 100 according to the embodiment of the present invention comprises a display body 10 and a base 30 capable of turning the display body 10 in a horizontal direction (along arrows A and B) by a prescribed angle (±30 degrees, for example) and inclining in a vertical direction (along arrows C and D) by a prescribed angle, as shown in FIG. 1. The display body 10 is an example of the "display screen portion" in the present invention.

Figure 2:
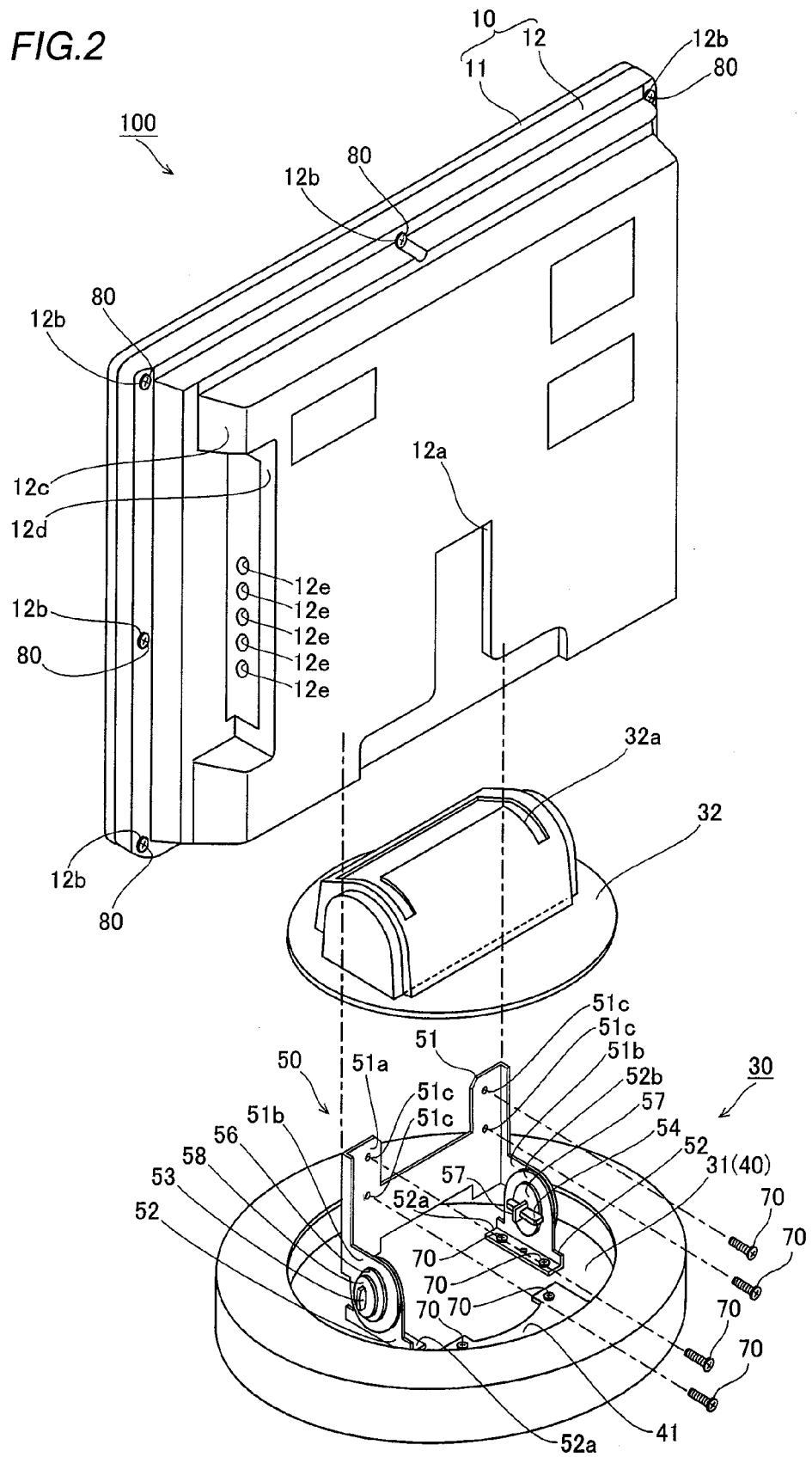
FIG. 2 is an exploded perspective view of the liquid crystal display according to the embodiment of the present invention shown in FIG. 1.
Figure 3:
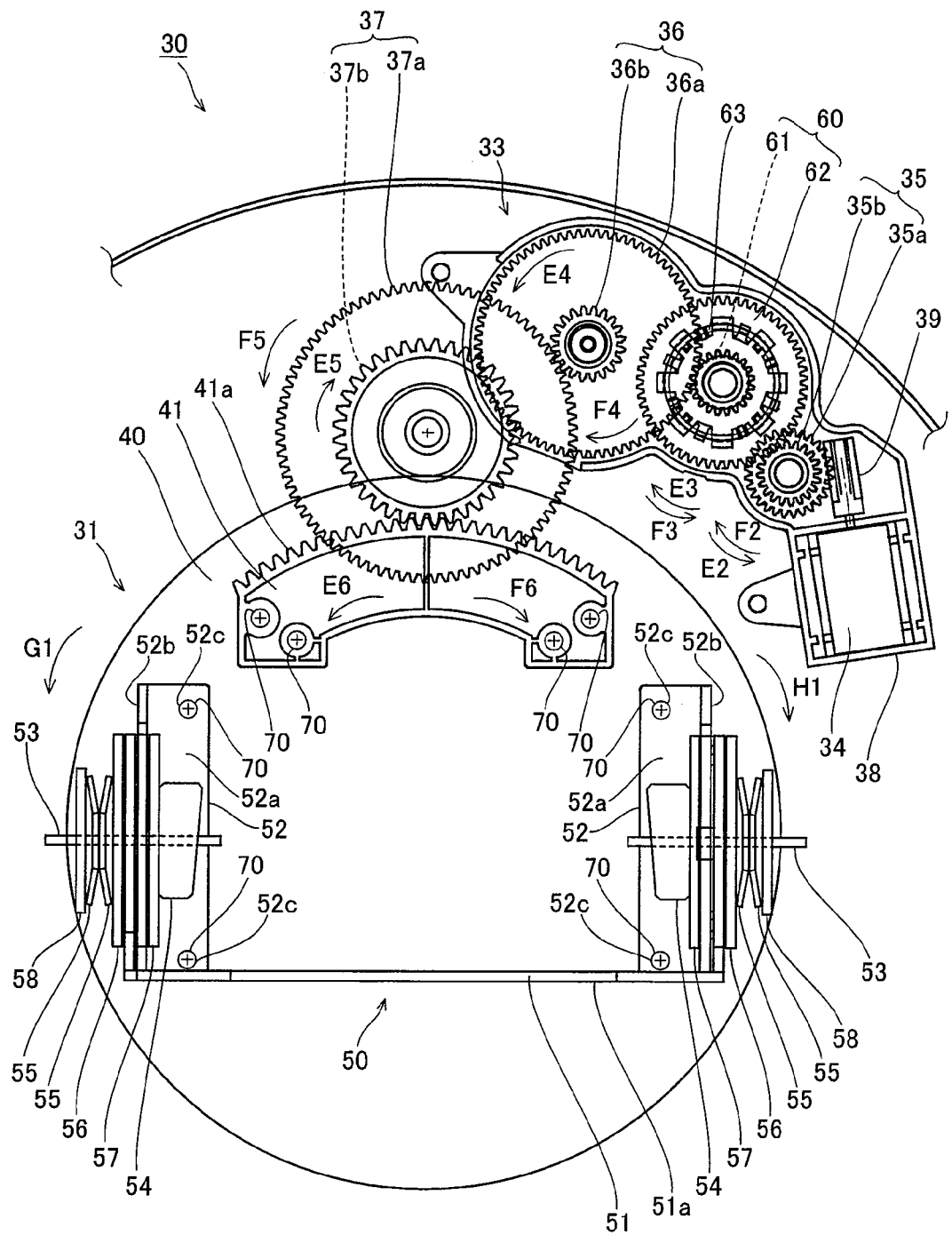
FIG. 3 is a plan view of the base provided with the torque limiter according to the embodiment of the present invention shown in FIG. 1.
Figure 4:
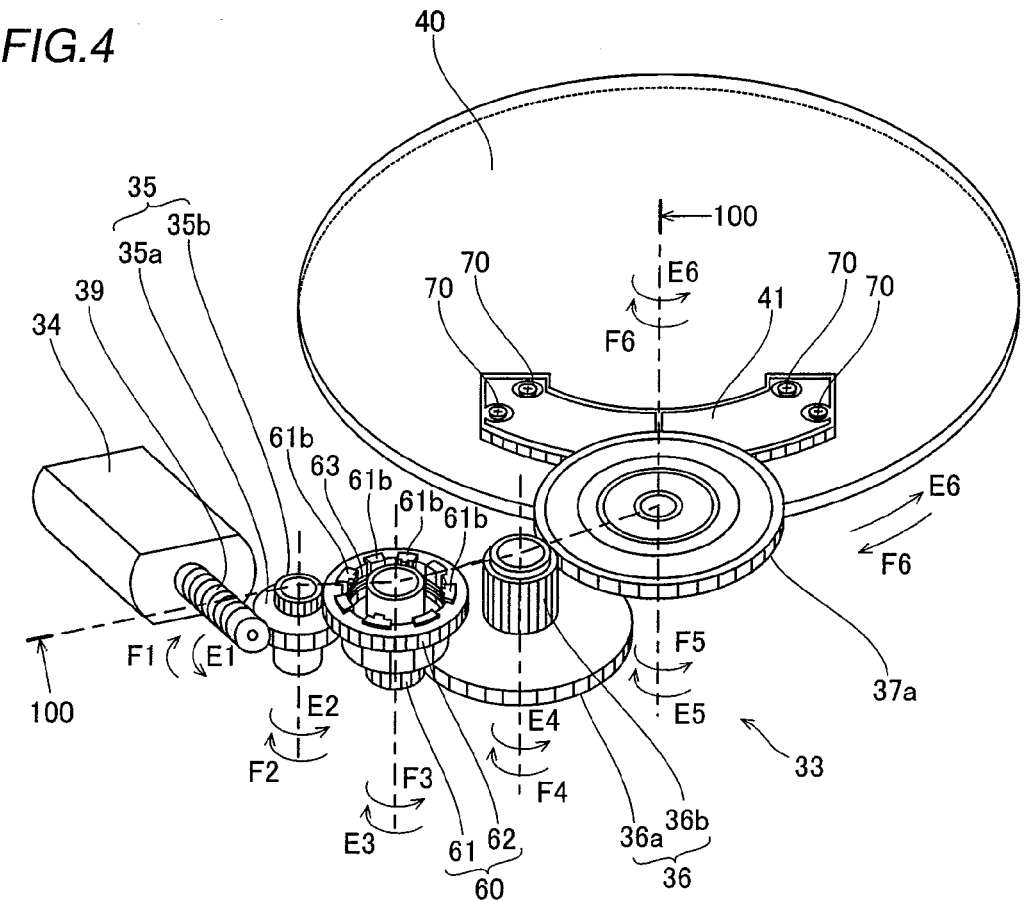
FIG. 4 is a perspective view for illustrating a structure of a transmission gear portion provided with the torque limiter according to the embodiment of the present invention shown in FIG. 1.

The base 30 is constituted by a display screen support mechanism 50 supporting a display body 10, a turning portion 31 for turning the display body 10 supported with the display screen support mechanism 50 in the horizontal direction (along arrows A and B in FIG. 1), and a cover member 32 made of resin, as shown in FIG. 2. As shown in FIG. 2, the turning portion 31 is rotatably arranged inside the base 30. As shown in FIG. 3, the inside of the base 30 is constituted by a transmission gear portion 33 for rotating the turning portion 31 and a stepping motor 34 employed as a driving source of the transmission gear portion 33. As shown in FIG. 4, the transmission gear portion 33 is constituted such that a gear 35 made of resin, a torque limiter 60, a gear 36 made of resin and a gear 37 made of resin are arranged in a gear box 38 made of resin. The torque limiter 60 is constituted such that the driving force of the stepping motor 34 is transmitted to the turning portion 31 through the transmission gear portion 33 to turn the turning portion 31 inside the base 30 when the driving force of the stepping motor 34 is less than prescribed driving torque, while the driving force of the stepping motor 34 is not transmitted to the turning portion 31 when the driving force of the stepping motor 34 is prescribed driving torque or more. The stepping motor 34 is an example of the "driving source" in the present invention.

Figure 6:
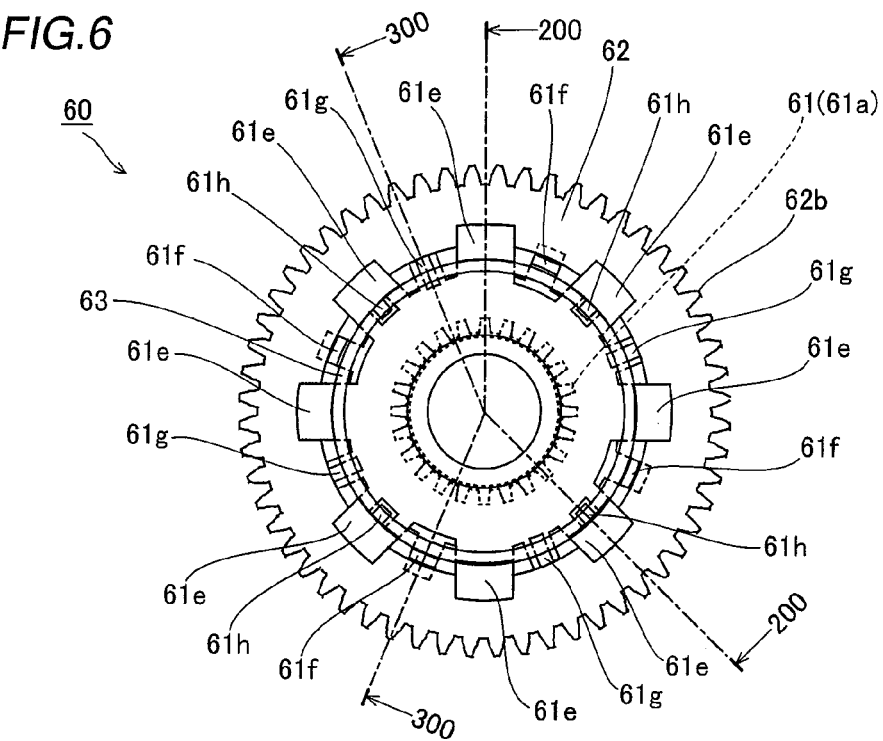
FIG. 6 is a plan view of the torque limiter according to the embodiment of the present invention shown in FIG. 1.
Figure 7:
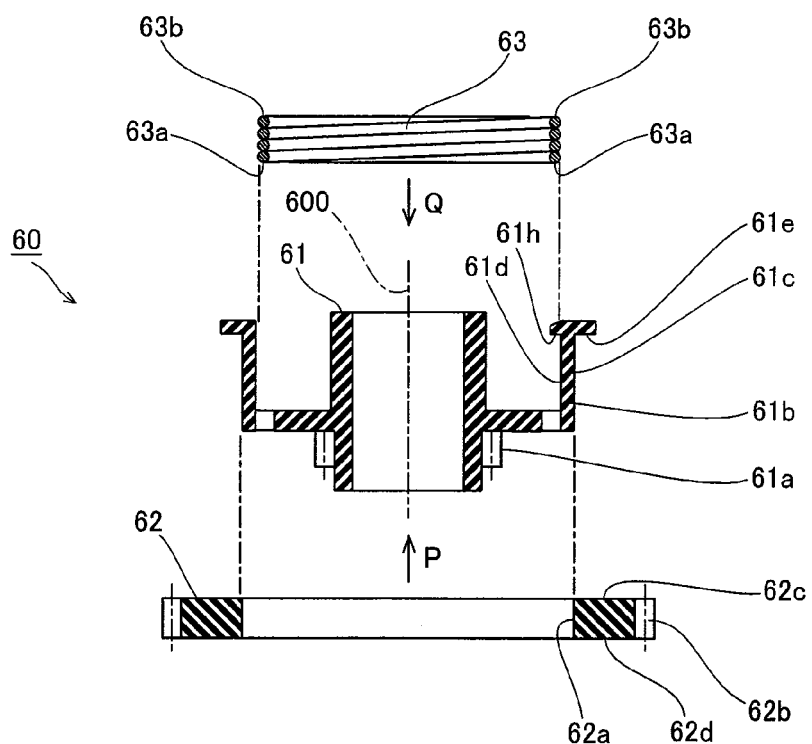
FIG. 7 is an exploded diagram of the torque limiter according to the embodiment of the present invention shown in FIG. 1.
Figure 8:
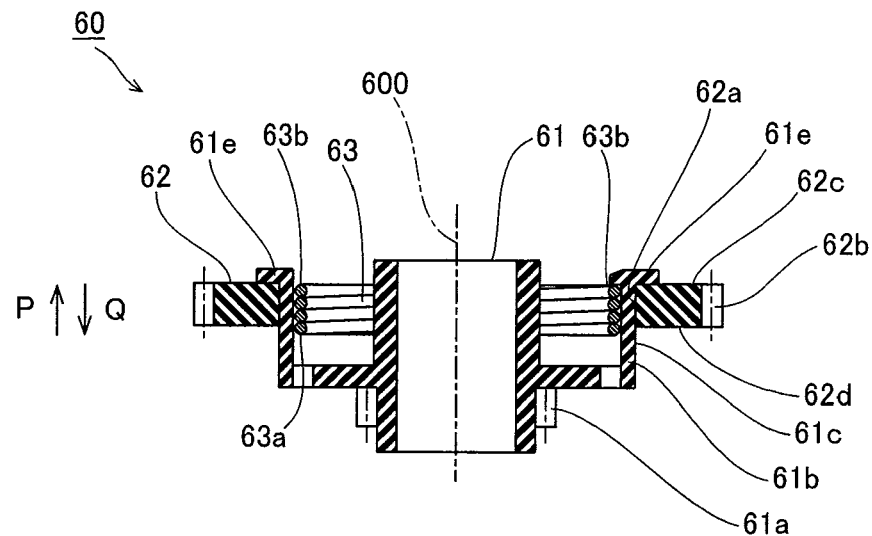
FIG. 8 is a sectional view taken along the line 200-200 in FIG. 7.

According to this embodiment, the torque limiter 60 is constituted by a driven gear 61 made of resin, a drive gear 62 made of resin and a spring member 63 (coil spring) made of metal, as shown in FIGS. 6 and 7. The driven gear 61 and the drive gear 62 are examples of the "first rotating member" and the "second rotating member" in the present invention respectively. In the driven gear 61, a plurality of support sections 61b (eight in this embodiment) concentric with a gear portion 61a and extending parallel to an axial direction of rotational axis (one-dot chain line 600) are integrally provided with the driven gear 61, as shown in FIG. 7. In other words, the eight support sections 61b are provided at equal angular intervals of 45 degrees. When the drive gear 62 is slid along arrow P (upward) from below the driven gear 61, an after-mentioned inner peripheral surface 62a of the drive gear 62 comes into contact with outer peripheral surfaces 61c of support sections 61b of the driven gear 61 so that the drive gear 62 can be fitted onto the driven gear 61. As shown in FIG. 7, when the spring member 63 is press-fitted along arrow Q (downward) from above the driven gear 61, an outer side surface of the spring member 63 comes into contact with inner peripheral surfaces 61d of the support sections 61b of the driven gear 61, whereby the support sections 61b of the driven gear 61 are radially expanded and pressed against the inner peripheral surface 62a of the drive gear 62 previously fitted as shown in FIG. 8.

Figure 9:
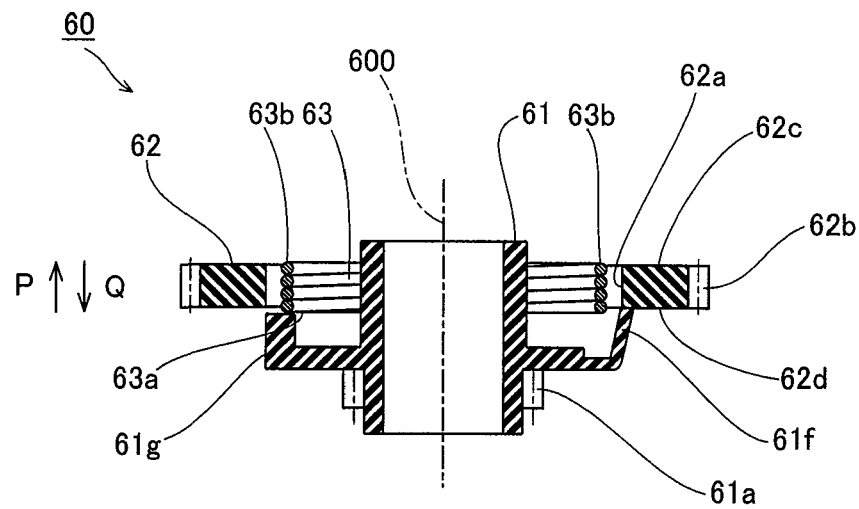
FIG. 9 is a sectional view taken along the line 300-300 in FIG. 7.
Figure 10:
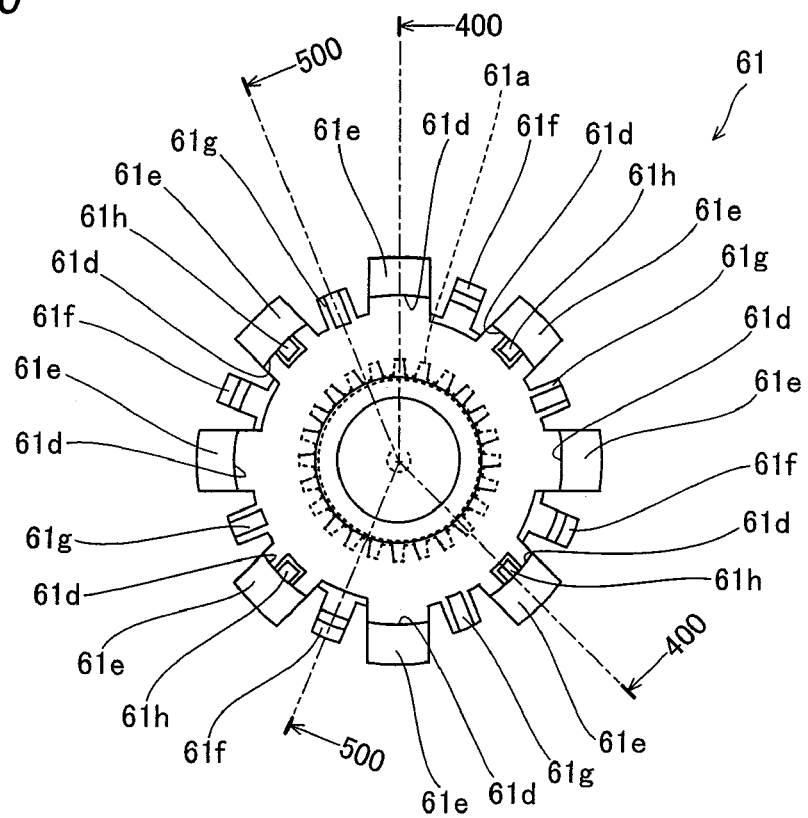
FIG. 10 is a plan view of a driven gear of the torque limiter according to the embodiment of the present invention shown in FIG. 1.
Figure 11:
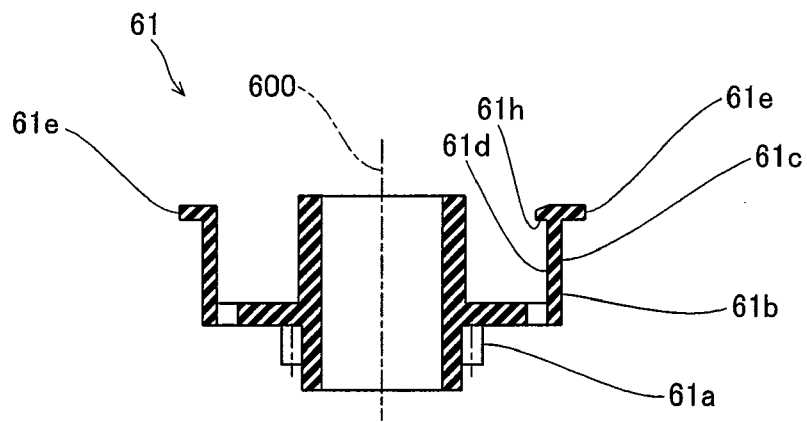
FIG. 11 is a sectional view taken along the line 400-400 in FIG. 10.
Figure 12:
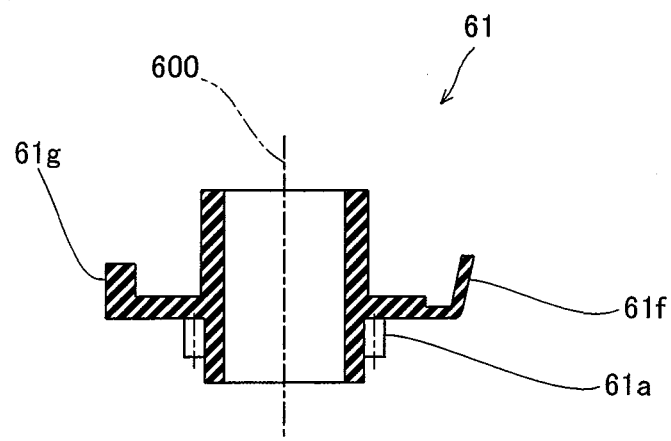
FIG. 12 is a sectional view taken along the line 500-500 in FIG. 10.

According to this embodiment, stop portions 61e horizontally extending from forward ends of the support sections 61b of the driven gear 61 toward the outer peripheral surfaces 61c of the support sections 61b are integrally formed with the support sections 61b as shown in FIGS. 10 and 11. These stop portions 61e each have a function of inhibiting the drive gear 62 from slipping out from the driven gear 61 along arrow P (upward) by bringing a first side surface 62c of the drive gear 62 into contact with the stop portions 61e when fitting the drive gear 62 around the driven gear 61 as shown in FIG. 8. As shown in FIGS. 10 and 12, a plurality of (four in this embodiment) stop sections 61f each extending slightly obliquely upward and outward from the axial direction of the rotational axis (one-dot chain line 600 in FIG. 12) between the support section 61b (see FIG. 10) and the support section 61b adjacent thereto (see FIG. 10) of the driven gear 61 are integrally provided with the driven gear 61. In other words, the four stop sections 61f are concentrically provided at equal angular intervals of 90 degrees. These stop sections 61f each have a function of inhibiting the drive gear 62 from slipping off from the driven gear 61 along arrow Q (downward) by bringing a second side surface 62d of the drive gear 62 into contact with the stop sections 61f when the drive gear 62 is fitted onto the driven gear 61 as shown in FIG. 9. As shown in FIGS. 8 and 9, the drive gear 62 is constituted such that a position to be rotatably fitted on the outer peripheral surfaces 61c of the support sections 61b of the driven gear 61 is located by the stop portions 61e (see FIG. 8) and the stop sections 61f (see FIG. 9) of the driven gear 61.

According to this embodiment, a plurality of (four in this embodiment) seat portions 61g each extending parallel to the axial direction of the rotational axis (one-dot chain line 600 in FIG. 12) between the support section 61b (see FIG. 10) and the support section 61b adjacent thereto (see FIG. 10) of the driven gear 61 are integrally provided with the driven gear 61, as shown in FIGS. 10 and 12. In other words, the four seat portions 61g are concentrically provided at equal angular intervals of 90 degrees. These seat portions 61g each have a function of holding the spring member 63 and inhibiting the spring member 63 from moving along arrow Q (downward) by bringing a first side surface 63a of the spring member 63 into contact with the seat portions 61g when the spring member 63 is press-fitted into the driven gear 61 as shown in FIG. 9. As shown in FIG. 11, projecting portions 61h are integrally formed with the support sections 61b so as to protruding toward the inner peripheral surfaces 61d of the forward ends of the support sections 61b of the driven gear 61. The projecting portions 61h each have a function of inhibiting the spring member 63 from slipping out from the driven gear 61 along arrow P (upward) by bringing a second side surface 63b of the spring member 63 into contact with the projecting portions 61h when the spring member 63 is press-fitted into the driven gear 61 as shown in FIG. 8. As shown in FIGS. 8 and 9, the spring member 63 is so formed as to be reliably kept in the state of being press-fitted into the inner peripheral surfaces 61g of the support sections 61b of the driven gear 61 with the seat portions 61g (see FIG. 9) and the projecting portions 61h (see FIG. 8) of the driven gear 61. As shown in FIG. 10, the stop sections 61f and the seat portions 61g of the driven gear 61 are provided such that each stop section 61f and each seat portion 61g are alternately arranged between each support section 61b and the support section 61b adjacent thereto.

Figure 13:
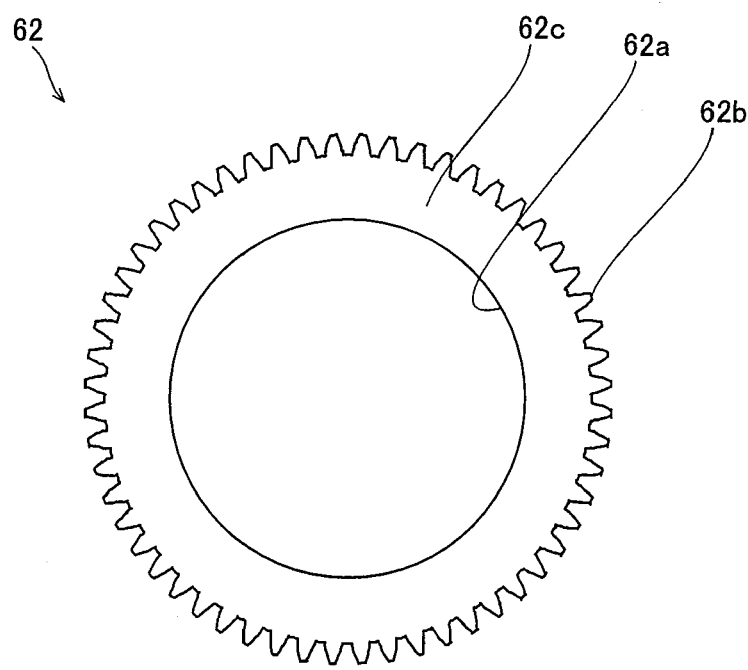
FIG. 13 is a plan view of a drive gear of the torque limiter according to the embodiment of the present invention shown in FIG. 1.

As shown in FIG. 13, the drive gear 62 made of resin has a hollow shape and is integrally provided with the inner peripheral surface 62a coming into contact with the outer peripheral surfaces 61c of the driven gear 61, a gear portion 62b, the first side surface 62c and the second side surface 62d.

According to this embodiment, the drive gear 62 of the torque limiter 60 is pressed against the driven gear 61 with urging force previously set by the spring member 63 as shown in FIG. 8, and therefore the inner peripheral surface 62a of the drive gear 62 and the outer peripheral surfaces 61c of the driven gear 61 slip so that all driving torque of the drive gear 62 is not transmitted to the driven gear 61, when driving torque, which is not less than the frictional force between the inner peripheral surface 62a of the drive gear 62 and the outer peripheral surfaces 61c of the driven gear 61 following the pressure contact force of the spring member 63, occurs with respect to the drive gear 62. On the other hand, when driving torque, which is less than the frictional force between the inner peripheral surface 62a of the drive gear 62 and the outer peripheral surfaces 61c of the driven gear 61 following the pressure contact force of the spring member 63, occurs with respect to the drive gear 62, the inner peripheral surface 62a of the drive gear 62 does not slip with respect to the outer peripheral surfaces 61c of the driven gear 61 so that the rotational frequency of the drive gear 62 is not transmitted to the driven gear 61.

Figure 5:
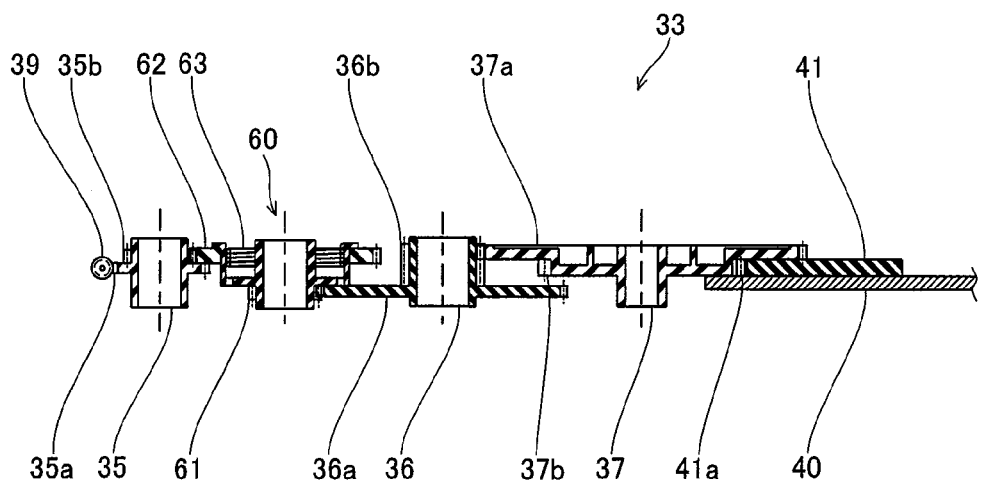
FIG. 5 illustrates arrangement of gears in the transmission gear portion provided with the torque limiter according to the embodiment of the present invention shown in FIG. 1.

As shown in FIG. 4, a worm gear 39 made of resin is press-fitted into the rotational axis of the stepping motor 34. As shown in FIGS. 4 and 5, the gear 35 integrally includes a major-diametral gear portion 35a and a minor-diametral gear portion 35b. The gear 36 integrally includes a major-diametral gear portion 36a and a minor-diametral gear portion 36b. The gear 37 integrally includes a major-diametral gear portion 37a and a minor-diametral gear portion 37b. As shown in FIGS. 3 and 4, the turning portion 31 of the base 30 is constituted by a circular turning plate 40 made of sheet metal and a turning gear member 41 made of resin. The turning gear member 41 is fixed on an upper surface of the turning plate 40 through screws 70. In FIG. 4, the gear box 38 (see FIG. 3) for arranging the transmission gear portion 33 and the stepping motor 34 therein is not shown in the drawing in order to describe a structure of the transmission gear portion 33.

As shown in FIGS. 4 and 5, the worm gear 39 is meshed with the major-diametral gear portion 35a of the gear 35 perpendicular to the rotational axis and the minor-diametral gear portion 35b of the gear 35 is meshed with the gear portion 62b of the drive gear 62 of the torque limiter 60 parallel to the rotational axis. As shown in FIGS. 4 and 5, the gear portion 61a of the driven gear 61 of the torque limiter 60 is meshed with the major-diametral gear portion 36a of the gear 36 parallel to the rotational axis and the minor-diametral gear portion 36b of the gear 36 is meshed with the major-diametral gear portion 37a of the gear 37 parallel to the rotational axis. As shown in FIGS. 4 and 5, the minor-diametral gear portion 37b of the gear 37 is meshed with the turning gear portion 41a of the turning gear member 41 parallel to the rotational axis. Therefore, the driving force of the stepping motor 34 is transmitted to the turning plate 40 through the worm gear 39, the gear 35, the torque limiter 60, the gear 36, the gear 37 and the turning gear member 41 from arrangement of the aforementioned gear member shown in FIGS. 4 and 5.

The display screen support mechanism 50 is fixed to the upper surface of the turning plate 40 of the turning portion 31 provided in the base 30 through the four screws 70 as shown in FIG. 2, for rendering the display body 10 rotatable in the vertical direction (along arrows C and D) with respect to the base 30 while supporting the display body 10 in a state inclined in the vertical direction (along arrows C and D) by a prescribed angle with respect to the base 30, as shown in FIG. 1.

As shown in FIGS. 2 and 3, the display screen support mechanism 50 is constituted by a display screen support member 51 made of sheet metal, a pair of vertical support members 52, plate like support shafts 53 of sheet metal, stop members 54 of sheet metal, disc springs 55 of metal (four disc springs in this embodiment), pressure-contact plates 56 and 57 of sheet metal and plate members 58 coming into contact with the disk springs 55 of metal, and the display screen support member 51 is mounted on the pair of vertical support members 52 so as to be rotatable at prescribed torque or more.

The display screen support member 51 made of sheet metal integrally includes a display body mounting portion 51a and a pair of rotating portions 51b as shown in FIG. 2. The display body mounting portion 51a of the display screen support member 51 is provided with four screw receiving holes 51c. The pair of rotating portions 51b of the display screen support member 51 are so provided as to extend from both side ends of the display body mounting portion 51a in a vertical direction with respect to a surface of the display body mounting portion 51a respectively.

The pair of vertical support members 52 include rotating member mounting portions 52a and rotating portion mounting portion 52b respectively, as shown in FIGS. 2 and 3. The rotating member mounting portions 52a of the vertical support members 52 are provided with four screw receiving holes 52c (see FIG. 3). The rotating portion mounting portion 52b of the vertical support members 52 are so provided as to upwardly extend in a vertical direction with respect to surfaces of the rotating member mounting portions 52a from first ends of the rotating member mounting portions 52a.

As shown in FIGS. 1 and 2, the display body 10 is constituted by a front cabinet 11 made of resin and a rear cabinet 12 made of resin. A liquid crystal module (not shown) mounted with a liquid crystal panel (not shown) is so formed inside the display body 10 as to be surrounded by the front cabinet 11 and the rear cabinet 12. The display body 10 is mounted on the display screen support member 51 by fastening the screws 70 to screw mounting holes (not shown) through the screw receiving holes 51a of the display screen support member 51. The rear cabinet 12 is integrally provided with a notch 12a for arranging the display screen support member 51 in a concealed manner. A plurality of screw receiving holes 12b (seven portions in this embodiment) are provide on outer peripheral portion of the rear cabinet 12 so that the rear cabinet 12 is mounted on the front cabinet 11 through screws 80. As shown in FIG. 2, a rectangular recess portion 12d is formed in the side surface portion 12c of the rear cabinet 12 and is formed with a plurality of through-holes 12e. The plurality of through-holes 12e is provided for connecting cables from AV terminals (not shown) connected to control boards (not shown) for controlling the liquid crystal module to an external apparatus of the display body 10.

A cover member 32 made of resin is mounted on an upper portion of the base 30, as shown in FIG. 2. The cover member 32 made of resin is provided with a notch 32a for rotatably arranging the display screen support mechanism 50.

A horizontal turning operation of the base provided with the torque limiter according to this embodiment will be now described with reference to FIGS. 1, 3, 4, 14 and 15.

As shown in FIG. 3, a user presses an auto-turn button (not shown) of an attached remote control (not shown) in a state where the display screen support member 51 is directed forward (state where a central portion of the turning gear portion 41a of the turning gear member 41 is meshed with the minor-diametral gear portion 37b of the gear 37), whereby a signal turning the display body 10 (see FIG. 1) in a horizontal direction (along arrow A in FIG. 1) is transmitted to a control circuit portion (not shown) of the display body 10. The stepping motor 34 of the base 30 is driven in the basis of this signal. More specifically, the worm gear 39 mounted on the stepping motor 34 rotates along arrow E1 (see FIG. 4) following the drive of the stepping motor 34 and the drive gear 62 of the torque limiter 60 rotates along arrow E3 through the gear 35, as shown in FIG. 3. The driven gear 61 of the torque limiter 60 rotates along arrow E3 and the turning gear member 41 rotates along arrow E6 through the gear 36 and the gear 37. Thus, the turning portion 31 mounted with the display screen support member 51 start turning along arrow G1 as shown in FIG. 14 and hence the display body 10 (see FIG. 1) starts turning along arrow A (see FIG. 1).

Figure 14:
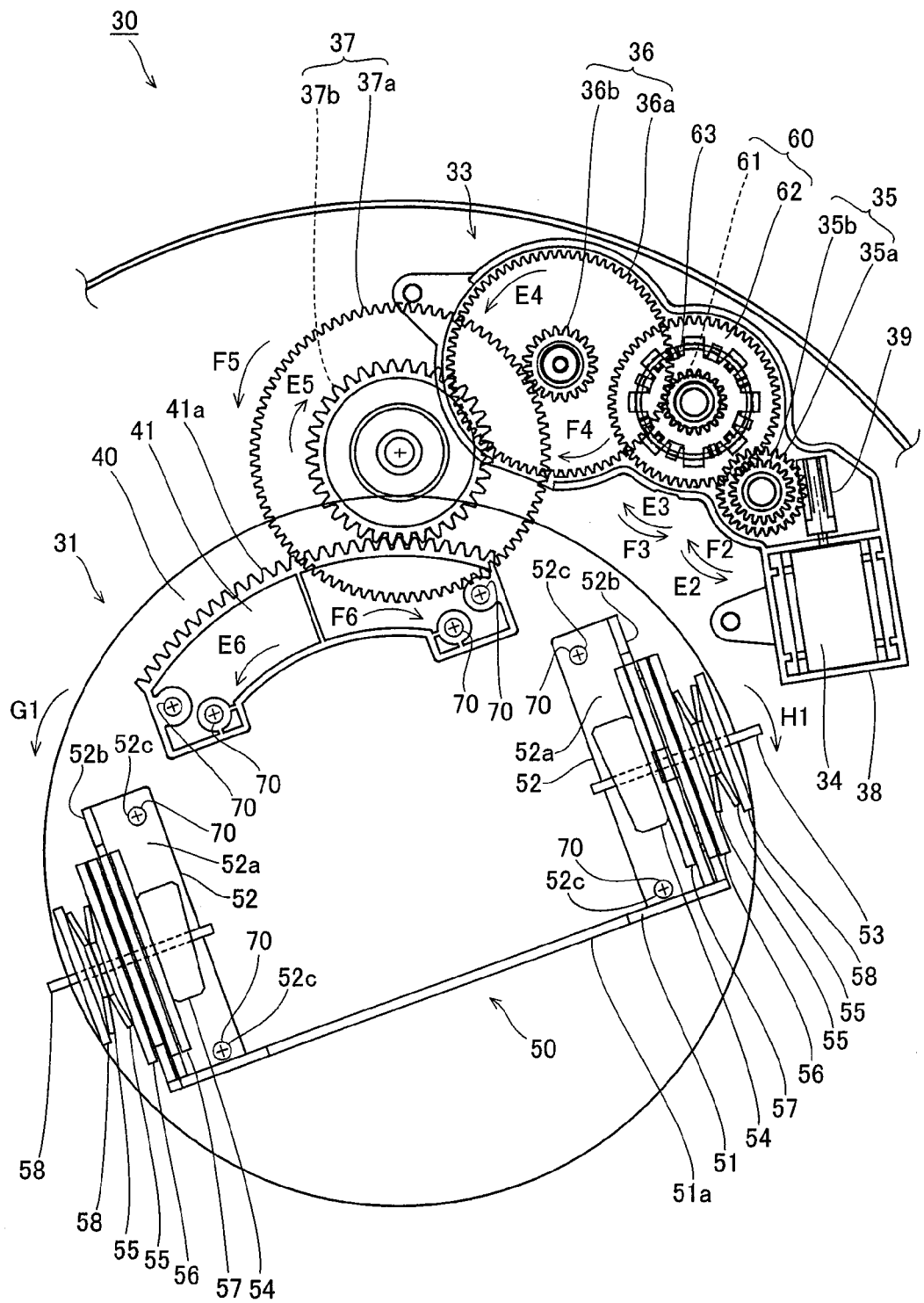
FIGS. 14 and 15 are diagrams for illustrating a turning operation of a display body according to the embodiment of the present invention shown in FIG. 1.
Figure 15:
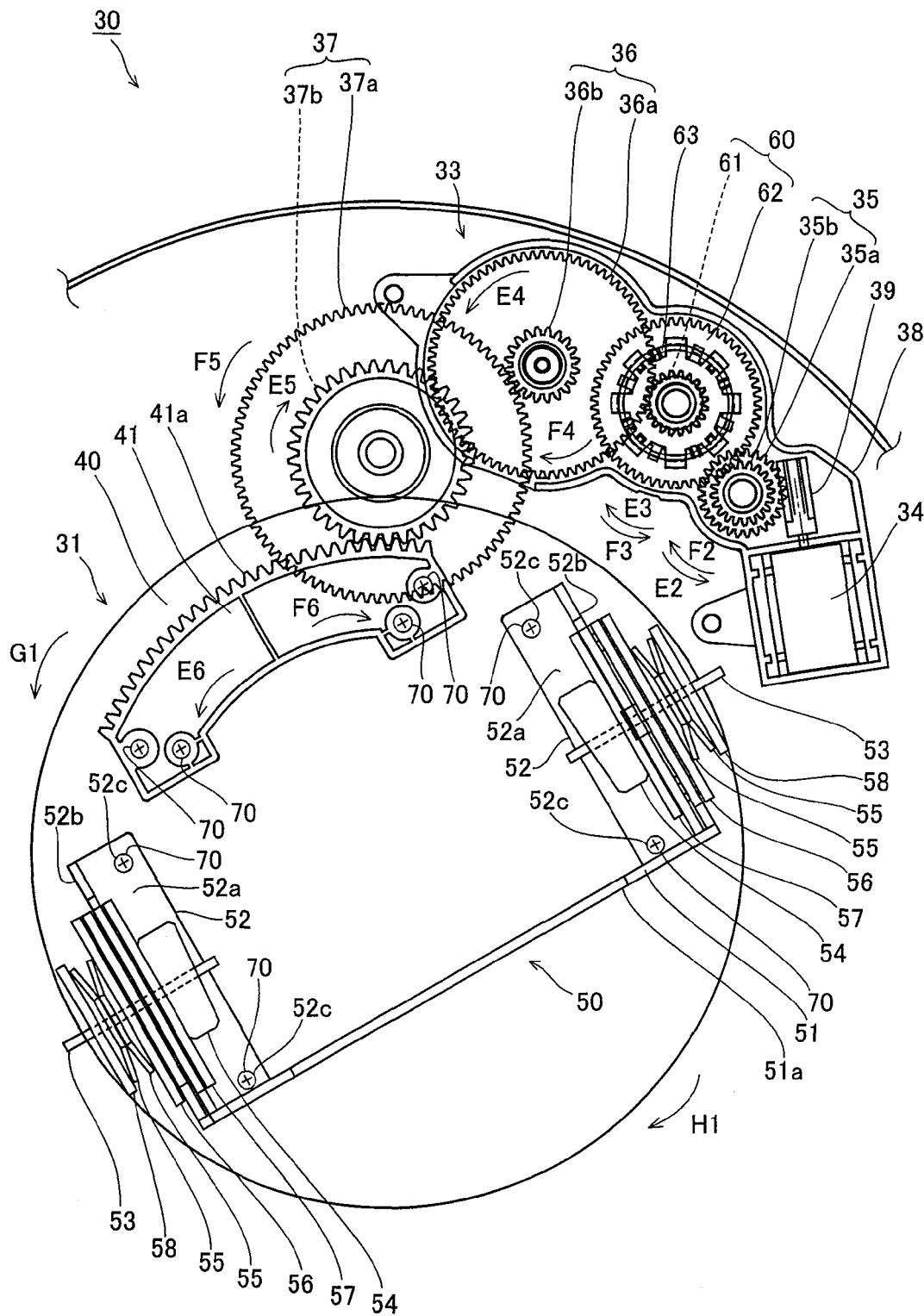

As shown in FIG. 14, the turning portion 31 placed with the display body 10 continuously turns along arrow A (see FIG. 1) at a prescribed rotational speed.

When the display body 10 is turned by an angle desired by the user, the user releases the press of the auto-turn button (not shown) of the attached remote control (not shown), whereby the signal turning the display body 10 (see FIG. 1) in the horizontal direction (along arrow A in FIG. 1) is not transmitted to the control circuit portion (not shown) of the display body 10. Therefore, the drive of the stepping motor 34 is stopped. Thus, the turning portion 31 stops the turn along arrow G1 at a position shown in FIG. 14 and stands still.

In a state where the user continues the turning operation of the display body 10 (see FIG. 1) along arrow A (see FIG. 1), when the turning angle of the turning portion 31 is maximum, the turning plate 40 comes into contact with a stopper member (not shown) provided inside the turning portion 31 to regulate the turning operation. Therefore, the turning portion 31 stops the turn along arrow G1 at a position shown in FIG. 15 and stands still. At this time, the stepping motor 34 continuously drives and hence driving torque transmitted from the stepping motor 34 is transmitted to the drive gear 62 of the torque limiter 60 through the worm gear 39 and the gear 35.

According to this embodiment, the drive gear 62 is pressed against the driven gear 61 with the urging force previously set by the spring member 63, and therefore the inner peripheral surface 62a of the drive gear 62 and the outer peripheral surfaces 61c of the driven gear 61 slip so that the driving torque of the drive gear 62 is not transmitted to the driven gear 61, when driving torque, which is not less than the frictional force between the inner peripheral surface 62a of the drive gear 62 and the outer peripheral surfaces 61c of the driven gear 61 following the pressure contact force of the spring member 63, occurs with respect to the drive gear 62. In other words, the driven gear 61 stops rotation regardless of the rotation of the drive gear 62. The driving torque is not transmitted to the driven gear 61, the gear 36, the gear 37 and the turning gear member 41 following the drive gear 62 of the torque limiter 60.

While the turning portion 31 is turned along arrow G1 shown in FIG. 14 in the description of the aforementioned turning operation, the torque limiter 60 turns the turning portion 31 along arrow H1 by rotational operation (torque control) similar to the aforementioned rotational operation and the display body 10 (see FIG. 1) is turned along arrow B (see FIG. 1) also at the time of a turning operation along arrow H1 opposite to arrow G1.

According to this embodiment, as hereinabove described, the transmission gear portion 33 includes the torque limiter 60 constituted by three members of the driven gear 61 integrally provided with the eight support sections 61b formed concentrically with the rotational axis at equal angular intervals of 45 degrees, the drive gear 62 fitted onto the outer peripheral surfaces 61c of the support sections 61b of the driven gear 61, and the spring member 63 press-fitted into the inner peripheral surfaces 61d of the support sections 61b of the driven gear 61 and pressing the support sections 61b against the drive gear 62, whereby the driving torque responsive to the pressure contact force by the spring member 63 can be transmitted from the drive gear 62 to the driven gear 61 while bringing the outer peripheral surfaces 61c of the support sections 61b of the driven gear 61 and the inner peripheral surface 62a of the drive gear 62 into direct surface contact with each other. Thus, the number of components can be inhibited from increase dissimilarly to a structure including a transmission gear portion having a torque limiter interposing a plurality of friction discs or a plurality of steel balls in addition to gear members such as a drive gear and a driven gear.

According to this embodiment, the spring member 63 is an annular coil spring and is so formed as to press-fitted into the inner peripheral surfaces 61d of the support sections 61b of the driven gear 61 in a state where the diameter of the coil is contracted from an unloaded state, whereby pressing force for expanding the support sections 61b of the driven gear 61 outward can be easily obtained through restoring force (elastic energy) restoring the shape of the spring from a state where the coil spring (spring member 63) is press-fitted into the inner peripheral surfaces 61d of the support sections 61b of the driven gear 61 into the unloaded state.

According to this embodiment, the forward ends of the support sections 61b of the driven gear 61 integrally include the stop portions 61e for inhibiting the drive gear 62 from slipping out along arrow P (see FIG. 7), whereby the stop portions 61e of the driven gear 61 come into contact with the first side surface 62c of the drive gear 62 and hence the drive gear 62 can be easily inhibited from slipping off from the driven gear 61 along arrow P (see FIG. 8) also when the drive gear 62 rotates at prescribed driving torque or more and slips on the outer peripheral surfaces 61c of the support sections 61b of the driven gear 61.

According to this embodiment, the driven gear 61 integrally include the stop sections 61f for inhibiting the drive gear 62 from slipping off along arrow Q (see FIG. 7), between the plurality of support sections 61b of the driven gear 61, whereby the stop sections 61f of the driven gear 61 come into contact with the second side surface 62d of the drive gear 62 and hence the drive gear 62 can be easily inhibited from slipping off from the driven gear 61 along arrow Q (see FIG. 9) also when the drive gear 62 rotates at prescribed driving torque or more and slips on the outer peripheral surfaces 61c of the support sections 61b of the driven gear 61.

According to this embodiment, the stop portions 61e and the stop sections 61f are so arranged as to hold the drive gear 62 therebetween from above and below along the rotational axial direction (one-dot chain line 600 in FIG. 12) of the drive gear 62, whereby the drive gear 62 can be reliably rotatably held on the outer peripheral surfaces 61c of the support sections 61b of the driven gear 61 with the plurality of stop portions 61e and stop sections 61f.

According to this embodiment, the driven gear 61 integrally includes the seat portions 61g for holding the spring member 63, between the plurality of support sections 61b of the driven gear 61, whereby the seat portions 61g inhibit the spring member 63 from moving along arrow Q (see FIG. 9) and hence the spring member 63 can be reliably arranged on the inner peripheral surfaces 61d of the support sections 61b of the driven gear 61.

According to this embodiment, the driven gear 61 integrally includes the projecting portions 61h for inhibiting the spring member 63 from slipping off along arrow P (see FIG. 7), on the forward ends of the inner peripheral surfaces 61d of the support sections 61b of the driven gear 61, whereby the projecting portions 61h of the driven gear 61 inhibit the spring member 63 from moving along arrow P (see FIG. 8) and hence the spring member 63 can be easily inhibited from slipping off from the inner peripheral surfaces 61d of the support sections 61b of the driven gear 61 along arrow P (see FIG. 8).

According to this embodiment, the projecting portions 61h and the seat portions 61g are so arranged as to hold the spring member 63 therebetween from above and below, whereby the spring member 63 can be reliably held on the inner peripheral surfaces 61d of the support sections 61b of the driven gear 61 with the plurality of projecting portions 61h and seat portions 61g.

According to this embodiment, the eight support sections 61b of the driven gear 61 are concentrically arranged at equal angular intervals of 45 degrees and each stop section 61f and each seat portion 61g (four each) are alternately provided between the support sections 61b, whereby the driven gear 61 is integrally provided with the support sections 61b, the stop sections 61f and the seat portions 61g concentrically having different functions respectively and hence the driven gear 61 can stably arrange the drive gear 62 and the spring member 63.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment of the present invention is applied to the base of the liquid crystal display employed as an exemplary display, the present invention is not restricted to this but is also applicable to a display base having a display screen (display panel) other than the liquid crystal panel such as an organic EL panel.

While the eight support sections 61b of the driven gear 61 are provided at equal angular intervals of 45 degrees in the aforementioned embodiment, the present invention is not restricted to this but the support sections 61b of the driven gear 61 may not be alternatively at equal angular intervals of 45 degrees, or the number of the support sections 61b may be alternatively other than eight.

While the four stop sections 61f, the four seat portions 61g and the four projecting portions 61h of the driven gear 61 are provided at equal angular intervals respectively in the aforementioned embodiment, the present invention is not restricted to this but the stop sections 61f, the seat portions 61g and the projecting portions 61h may not be alternatively provided at equal angular intervals respectively, or the respective numbers of the stop sections 61f, the seat portions 61g and the projecting portions 61h may be alternatively other than four.

While the plurality of gear members constituting the transmission gear portion 33 are made of resin in the aforementioned embodiment, the present invention is not restricted to this but the transmission gear portion may be alternatively constituted by gear members made of metal other than the gear members made of resin, for example.

What is claimed is:

1. A display base for turning a display body, comprising:
a driving source turning a display screen portion; and
a transmission gear portion for transmitting driving force of said driving source to a turning portion, wherein
said transmission gear portion includes a torque limiter having
a driven gear member integrally provided with a plurality of support sections formed concentrically with rotational axis,
a drive gear member fitted onto outer peripheral surfaces of said support sections of said driven gear member, and
a spring member pressing said support sections toward a radial direction perpendicular to said rotational axis against said drive gear member by being press-fitted into inner peripheral surfaces of said support sections of said driven gear member.

2. The display base according to claim 1, wherein
said spring member constituting said torque limiter is an annular coil spring, and
said spring member is press-fitted into said inner peripheral surfaces of said support sections of said driven gear member in a state where the diameter of a coil is contracted from an unloaded state.

3. The display base according to claim 1, wherein
forward ends of said support sections of said driven gear member constituting said torque limiter integrally include stop portions for inhibiting said drive gear member from slipping off to a first side.

4. The display base according to claim 1, wherein
said driven gear member constituting said torque limiter integrally includes stop sections for inhibiting said drive gear member from slipping off to a second side, provided between said plurality of support sections of said driven gear member.

5. The display base according to claim 1, wherein
said driven gear member constituting said torque limiter integrally includes stop portions for inhibiting said drive gear member from slipping off to a first side, provided on forward ends of said support sections of said driven gear member, and stop sections for inhibiting said drive gear member from slipping off to a second side, provided between said plurality of support sections of said driven gear member, and
said stop portions and said stop sections are so arranged as to hold said drive gear member therebetween from above and below along a rotational axis direction of said drive gear member.

6. The display base according to claim 1, wherein
said driven gear member constituting said torque limiter integrally includes seat portions for holding said spring member, provided between said plurality of support sections of said driven gear member.

7. The display base according to claim 1, wherein
said driven gear member constituting said torque limiter integrally includes projecting portions for inhibiting said spring member from slipping off to a first side, provided on forward ends of said inner peripheral surfaces of said support sections of said driven gear member.

8. The display base according to claim 1, wherein
said driven gear member constituting said torque limiter integrally includes projecting portions for inhibiting said spring member from slipping off to a first side, provided on forward ends of said inner peripheral surfaces of said support sections of said driven gear member, and seat portions for holding said spring member, and
said projecting portions and said seat portions are so arranged as to hold said spring member therebetween from above and below.

9. The display base according to claim 1, wherein
said driven gear member constituting said torque limiter integrally includes stop sections for inhibiting said drive gear member from slipping off to a second side and seat portions for holding said spring member, and
a plurality of said support sections of said driven gear member are concentrically arranged at prescribed angle intervals, and said stop sections and said seat portions are alternately provided between said support sections.

10. The display base according to claim 1, wherein
said driven gear member constituting said torque limiter integrally includes a driven gear portion, and said drive gear member integrally includes a drive gear portion.

* * * * *